(No Model.)
H. MARTINI.
AIR STORING PIPES IN STEAM HEATING PLANTS.
No. 526,497. Patented Sept. 25, 1894.
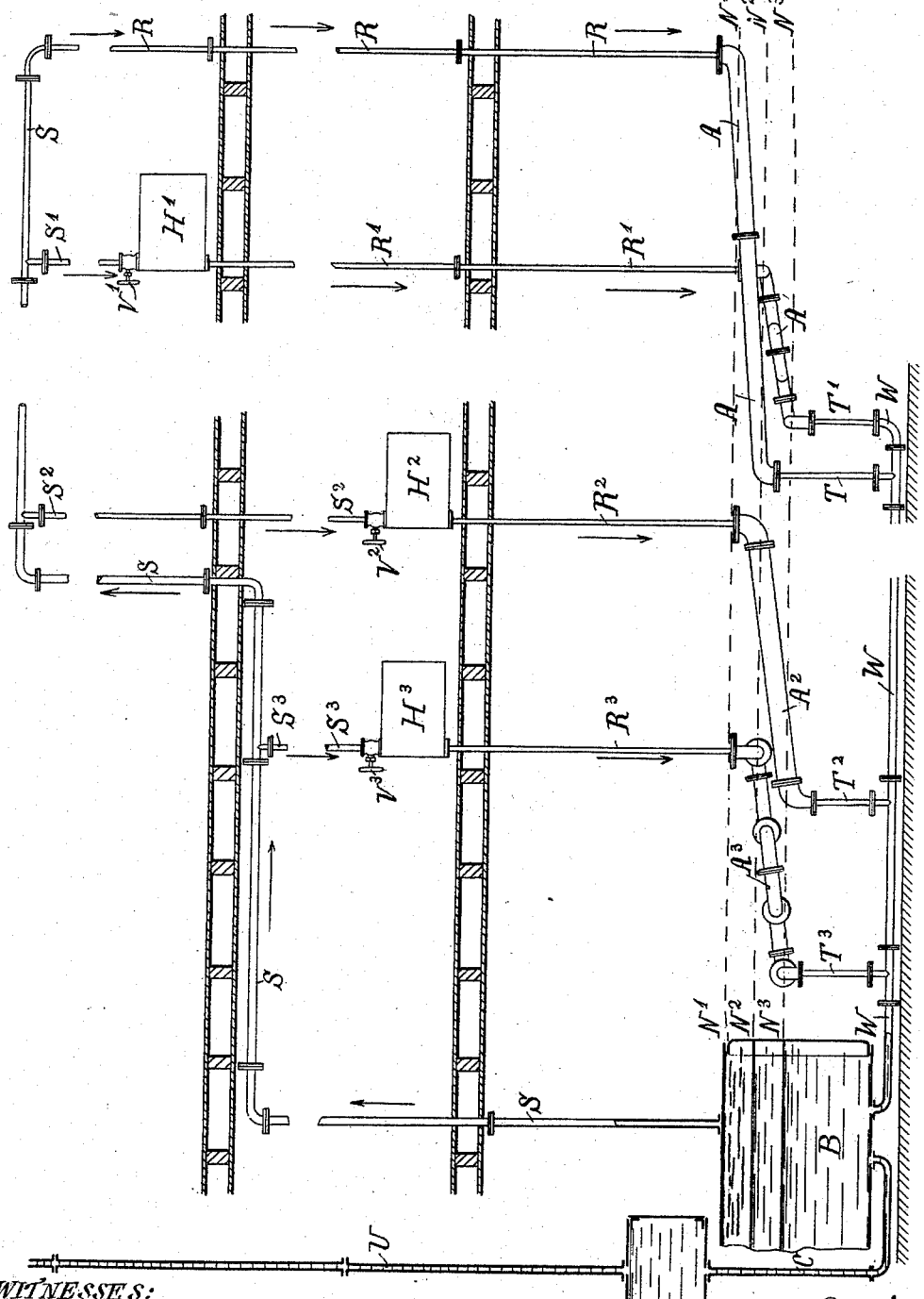
WITNESSES:
INVENTOR
Hermann Martini
BY
ATTORNEYS.

UNITED STATES PATENT OFFICE.

HERMANN MARTINI, OF LEIPSIC, GERMANY.

AIR-STORING PIPES IN STEAM-HEATING PLANTS.

SPECIFICATION forming part of Letters Patent No. 526,497, dated September 25, 1894.

Application filed November 1, 1893. Serial No. 489,719. (No model.)

*To all whom it may concern:*

Be it known, that I, HERMANN MARTINI, a subject of the Emperor of Germany, and a resident of Leipsic, Saxony, Germany, have invented certain new and useful Improvements in Air-Storing-Pipes in Steam-Heating Plants, of which the following is a specification.

The object of my invention is to provide new and improved air-storing pipes, which form parts of a closed steam-heating plant and are so arranged, that they are filled with water, when the plant is not in use, but are emptied of the water and serve for the storage of the air from the pipe-system, when the plant is in use, thereby every objection and inconvenience arising from the presence of the air in the heating apparatuses and the pipe-system is avoided, and every valve arrangement or other means for extracting the air, before the plant is put in working order, is rendered unnecessary.

The invention consists in the construction of pipes in any usual way and the arrangement of the same in an inclined position between the horizontal planes of the highest and of the lowest water level in steam-boiler and pipe-system, in a manner which will be fully described hereinafter and finally pointed out in the claim.

In the accompanying drawing, a steam-heating plant is shown in diagram in order to better explain the object of this invention.

B denotes the steam-boiler, preferably placed in the cellar of a house, N' N' the line of the highest water level, $N^2 N^2$ that of the mean and $N^3 N^3$ that of the lowest water level.

S is the main steam-pipe and W the main water return-pipe, which are connected at the ends by the pipes R, A, T. Both mains S and W are bent and led according to the circumstances; also they may be divided into branches. The radiators employed in the heating-plant may be of any kind and construction. Of these, three are shown and marked H', $H^2$, $H^3$, the first one being on the second floor and the others on the first floor of the building that is to be heated. The radiators are connected with the steam-main S (or its branches, if there be any) by pipes S', $S^2$, $S^3$, and may be disconnected therefrom by means of cocks or valves, V', $V^2$, $V^3$. They are also connected with the water return-main W (or its branches) by pipes R', A', T', $R^2$, $A^2$, $T^2$, $R^3$, $A^3$, $T^3$. The pipe A (connected with the condense water-pipe R) is arranged in an inclined position between the levels N', N', and $N^2$, $N^2$ and has such a capacity as is sufficient for receiving and storing the air out of the steam-main S and the pipe R. In a similar manner, the inclined pipe A' located between the levels $N^2$, $N^2$ and $N^3$, $N^3$ has the required capacity for the storage of the air from the pipe S', the radiator H' and the condense water-pipe R'. The inclined pipe $A^2$ has equally the capacity of storing the air out of the pipe $S^2$, the radiator $H^2$ and the condense water-pipe $R^2$. The inclined pipe $A^3$, again, serves for the storage of the air out of the pipe $S^3$, the radiator $H^3$ and the condense water-pipe $R^3$, and in like manner any further pipes are arranged that appertain to radiators contained in the plant. It does not matter, what size they are and what shape they have, provided they have the contents necessary for storing the named air quantities. They may be straight as A or $A^2$, or curved to any extent; also, they may be coil-shaped such as A' or $A^3$, but they must be so inclined as to allow of the condense water flowing off without interference from the air. Above the boiler B is placed a tank D capable of taking up all the water that is contained in the boiler B, and in the pipe-system between the planes of the levels N', N' and $N^3$, $N^3$. Tank D is connected with the boiler by the pipe C and is provided with an open stand-pipe U, by which the steam-pressure in the boiler is limited.

In order to explain the working of the plant, it is first assumed, that at the beginning the boiler and the pipe-system up to the level N', N' are full of water, while above that level only air is contained in the various pipes and radiators, also that all the valves V', $V^2$, $V^3$ are opened. On firing the boiler B steam will be developed and enter the main pipe S (and its branches, if there be any) as well as the radiators, driving away all the air in the direction of the arrows. In the same proportion as the pressure of the steam in the steam space increases it expels the water out of the boiler and pipes, and forces it up into the tank D and the stand-pipe U until the water level arrives at the line $N^3$, $N^3$. Then the pipes A, A', $A^2$, $A^3$, will be emptied of the water and all the air contained in the respective parts named above will have sunk into them by reason of its greater weight. Now all the heating pipes and radiators above the level N', N' are filled up entirely with steam, so that the steam is enabled to exert its full heating power without being impaired by the air.

The air-storing pipe A is arranged between the levels N', N' and $N^2$, $N^2$ in order that the steam-main S (respectively its branches) with the condense water-pipe R may be first filled with steam ere the radiators take their turns. In a similar manner any radiator that is required to be heated in precedence to the others, may have its air-storing pipe arranged higher up than the others.

When a radiator, say $H^2$, is shut out by closing its valve $V^2$, the steam contained in it condenses and the space is again filled up with the air returning from the air-storing pipe $A^2$, while in the latter the air is replaced by water. A similar occurence will take place on putting the whole plant out of use.

Having thus described my invention, I claim as new and desire to secure by Letters Patent—

In a steam-heating plant, the combination with the boiler and a tank communicating therewith, of the steam-main leading from the boiler, the main water return-pipe, condense water-pipes leading from the steam-main to the return-pipe, and an inclined pipe of any suitable shape interposed in every condense water-pipe, said pipe being arranged between the horizontal plane of the highest and lowest water level in the boiler and pipe-system for the purpose of storing the air originally contained in the parts above it, and said boiler always having a steam space in its upper part during the operation of the apparatus, the water displaced from said steam-space being caused to enter the said tank, substantially as set forth.

In testimony that I claim the foregoing as my invention I have signed my name in presence of two subscribing witnesses.

HERMANN MARTINI.

Witnesss.
CARL BORNGRAEBER,
JOHANN HARTOG.